United States Patent
Wozniak

(10) Patent No.: US 11,008,115 B2
(45) Date of Patent: May 18, 2021

(54) FUEL SYSTEM FOR AN AIRCRAFT

(71) Applicant: Gulfstream Aerospace Corporation, Savannah, GA (US)

(72) Inventor: Gregg Wozniak, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 370 days.

(21) Appl. No.: 15/590,940

(22) Filed: May 9, 2017

(65) Prior Publication Data

US 2018/0327105 A1  Nov. 15, 2018

(51) Int. Cl.
| | |
|---|---|
| *B64D 37/32* | (2006.01) |
| *B64D 37/02* | (2006.01) |
| *F04D 29/043* | (2006.01) |
| *F04D 29/02* | (2006.01) |
| *F04D 13/08* | (2006.01) |
| *B64D 37/20* | (2006.01) |
| *F04D 13/06* | (2006.01) |
| *F04D 25/06* | (2006.01) |
| *F04D 29/40* | (2006.01) |

(Continued)

(52) U.S. Cl.
CPC .............. *B64D 37/32* (2013.01); *B64D 37/02* (2013.01); *B64D 37/20* (2013.01); *F04D 13/0606* (2013.01); *F04D 13/0626* (2013.01); *F04D 13/08* (2013.01); *F04D 25/06* (2013.01); *F04D 29/026* (2013.01); *F04D 29/043* (2013.01); *F04D 29/406* (2013.01); *F04D 29/44* (2013.01); *F04D 29/5806* (2013.01); *Y10T 137/86035* (2015.04); *Y10T 137/86091* (2015.04)

(58) Field of Classification Search
CPC .......... B64D 37/32; B64D 37/02; B64C 3/34; Y10T 137/86035; Y10T 137/86091; F04D 29/043; F04D 29/5806; F04D 29/026; F04D 25/06; F04D 13/0606; F04D 13/0626; F04D 29/406; F04D 29/4286; F04D 29/044; F02C 7/22
See application file for complete search history.

(56) References Cited

U.S. PATENT DOCUMENTS

| | | | |
|---|---|---|---|
| 2,312,525 A | * | 3/1943 | Curtis ................. F02M 37/08 244/135 R |
| 2,414,158 A | | 1/1947 | Mock |
| 2,418,231 A | | 4/1947 | Kimm et al. |

(Continued)

FOREIGN PATENT DOCUMENTS

| | | |
|---|---|---|
| JP | S5698558 A | 8/1981 |
| WO | 2007071908 A1 | 6/2007 |

*Primary Examiner* — Atif H Chaudry
(74) *Attorney, Agent, or Firm* — LKGlobal | Lorenz & Kopf, LLP

(57) ABSTRACT

A fuel system for an aircraft is provided including a fuel tank configured to receive fuel and a fuel pump. The fuel pump includes a motor disposed proximate the fuel tank. The fuel pump further includes a power supply in electrical communication with the motor and disposed outside the fuel tank. The fuel pump further includes an impeller disposed within the fuel tank and rotatably coupled to the motor. The impeller includes a shaft having a first end and a second end spaced from the first end with the motor coupled to the first end. The shaft has a resistivity greater than the resistivity of the fuel tank between the first end and the second end to minimize electrical transfer between the motor and the fuel.

18 Claims, 2 Drawing Sheets

(51) Int. Cl.
   *F04D 29/44*     (2006.01)
   *F04D 29/58*     (2006.01)

(56) References Cited

U.S. PATENT DOCUMENTS

| | | | |
|---|---|---|---|
| 2,442,639 A | | 6/1948 | Curtis |
| 2,845,871 A | | 8/1958 | Compton |
| 3,873,863 A | * | 3/1975 | Pew ................... H02K 7/145 |
| | | | 310/50 |
| 3,969,043 A | * | 7/1976 | Bright ................. F04D 13/06 |
| | | | 417/366 |
| 4,324,569 A | | 4/1982 | Klimczak |
| 5,414,992 A | | 5/1995 | Glickstein |
| 5,886,436 A | * | 3/1999 | Schneider ............ B08B 3/026 |
| | | | 310/87 |
| 6,182,435 B1 | | 2/2001 | Niggemann et al. |
| 6,415,595 B1 | | 7/2002 | Wilmot, Jr. et al. |
| 2004/0079150 A1 | * | 4/2004 | Breed .................. B60J 10/00 |
| | | | 73/291 |
| 2007/0207421 A1 | | 9/2007 | Heeter |
| 2009/0199823 A1 | | 8/2009 | Mahoney et al. |
| 2012/0271527 A1 | | 10/2012 | Zebrowski et al. |
| 2013/0092267 A1 | * | 4/2013 | Leighton ............. B64D 37/10 |
| | | | 137/565.01 |

* cited by examiner

FUEL SYSTEM FOR AN AIRCRAFT

TECHNICAL FIELD

The present invention generally relates to vehicles and more particularly relates to aircraft fuel systems.

BACKGROUND

Considerable testing and analysis is necessary to address single and dual-fault tolerance requirements for rules and regulation pertaining to fuel tank ignition prevention. One approach to address these requirements is to allow electrical power to enter the fuel tank, quantify the level of the electrical power, design for the level of the electrical power, and test for the level of the electrical power. When allowing electrical power to enter the fuel tank, all foreseeable failure modes that can create an ignition source must be accounted for by testing designs, implementing design changes where required, increasing maintenance inspections, and meeting complex certification strategies. Another approach is to minimize electrical transfer into the fuel tank thereby minimizing the foreseeable failure modes. One component of the fuel system that has the potential of allowing electrical current to enter the fuel tank is a fuel pump.

Conventional fuel pumps include a motor disposed within the fuel tank and a power supply disposed outside the fuel tank, and in direct electrical contact with, the fuel tank. An electrical fault occurring within the power supply may enter the fuel tank through the direct electrical path between the power supply and the fuel tank. Further, the power supply is cooled utilizing a fuel-cooled wash plate, which is thermally conductive. The wash plate may also inadvertently act as an electrical conductivity path between an electrical fault occurring within the power supply and the fuel tank. The fuel pump further includes an impeller disposed in the fuel tank with the impeller coupled to the motor by a shaft. The shaft of the impeller may act as an electrical conductivity path between an electrical fault occurring within the motor and the fuel tank.

Accordingly, it is desirable to provide an improved fuel system. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of a fuel system for an aircraft and various non-limiting embodiments of an aircraft including the same, are disclosed herein.

In one non-limiting embodiment, the fuel system includes, but is not limited to, a fuel tank configured to receive fuel. The fuel system further includes, but is not limited to, a fuel pump. The fuel pump includes, but is not limited to, a motor disposed proximate the fuel tank. The fuel pump further includes, but is not limited to, a power supply in electrical communication with the motor and disposed outside the fuel tank. The fuel pump further includes, but is not limited to, an impeller disposed within the fuel tank and rotatably coupled to the motor. The impeller includes a shaft having a first end and a second end spaced from the first end with the motor coupled to the first end. The shaft has a resistivity greater than the resistivity of the fuel tank between the first end and the second end to minimize electrical transfer between the motor and the fuel.

In another non-limiting embodiment, the aircraft includes, but is not limited to, a fuel system. The fuel system includes, but is not limited to, a fuel tank disposed in the aircraft and configured to receive fuel. The fuel system further includes, but is not limited to, a fuel pump. The fuel pump includes, but is not limited to, a motor disposed proximate the fuel tank. The fuel pump further includes, but is not limited to, a power supply in electrical communication with the motor and disposed outside the fuel tank. The fuel pump further includes, but is not limited to, an impeller disposed within the fuel tank and rotatably coupled to the motor. The impeller includes a shaft having a first end and a second end spaced from the first end with the motor coupled to the first end. The shaft has a resistivity greater than the resistivity of the fuel tank between the first end and the second end to minimize electrical transfer between the motor and the fuel.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

A fuel system for an aircraft is provided herein. In an exemplary embodiment, the fuel system includes a fuel tank configured to receive fuel and a fuel pump configured to move the fuel. The fuel pump includes a motor disposed outside the fuel tank. The motor may be coupled to and adjacent the fuel tank. The fuel pump further includes a power supply in electrical communication with the motor and disposed outside the fuel tank. The fuel pump further includes an impeller disposed within the fuel tank and rotatably coupled to the motor. The impeller includes a blade and a shaft with the shaft having a first end and a second end spaced from the first end. The motor is coupled to the first end and the blade is coupled to the second end. The shaft may have a resistivity in an amount of at least $1 \times 10^4$ ohm-meters between the first end and the second end to minimize electrical transfer between the motor and the fuel. In embodiments, the shaft has an infinite resistivity between the first end and the second end to prevent electrical transfer between the motor and the fuel.

The fuel system may further include an isolator component disposed between the motor and the fuel tank. The isolator component may have a resistivity in an amount of at least $1 \times 10^4$ ohm-meters to minimize electrical transfer between the power supply and the fuel. In embodiments, the isolator component has an infinite resistivity to prevent electrical transfer between the motor and the fuel. The isolator component may include, or may be formed from, a material having a resistivity in an amount of at least $1 \times 10^4$ ohm-meters. The material may include, or may be formed from, a phenolic material. In embodiments, the phenolic material is of appropriate mechanical strength but without the ability to conduct electrical energy.

The power supply may generate heat during operation of the motor. As a result of the generation of heat, the power supply may have an increase in temperature. To reduce the temperature of the power supply, the fuel system may further include a cooling component in fluid communication with the power supply to transfer the heat away from the power supply. The cooling component may include a fan configured to move a fluid carrier, such as air, proximate the power supply to transfer heat away from the power supply. The fluid carrier may be substantially free of fuel to minimize electrical transfer between the power supply and the fuel.

A greater understanding of the system described above may be obtained through a review of the illustrations accompanying this application together with a review of the detailed description that follows.

Figure 1:
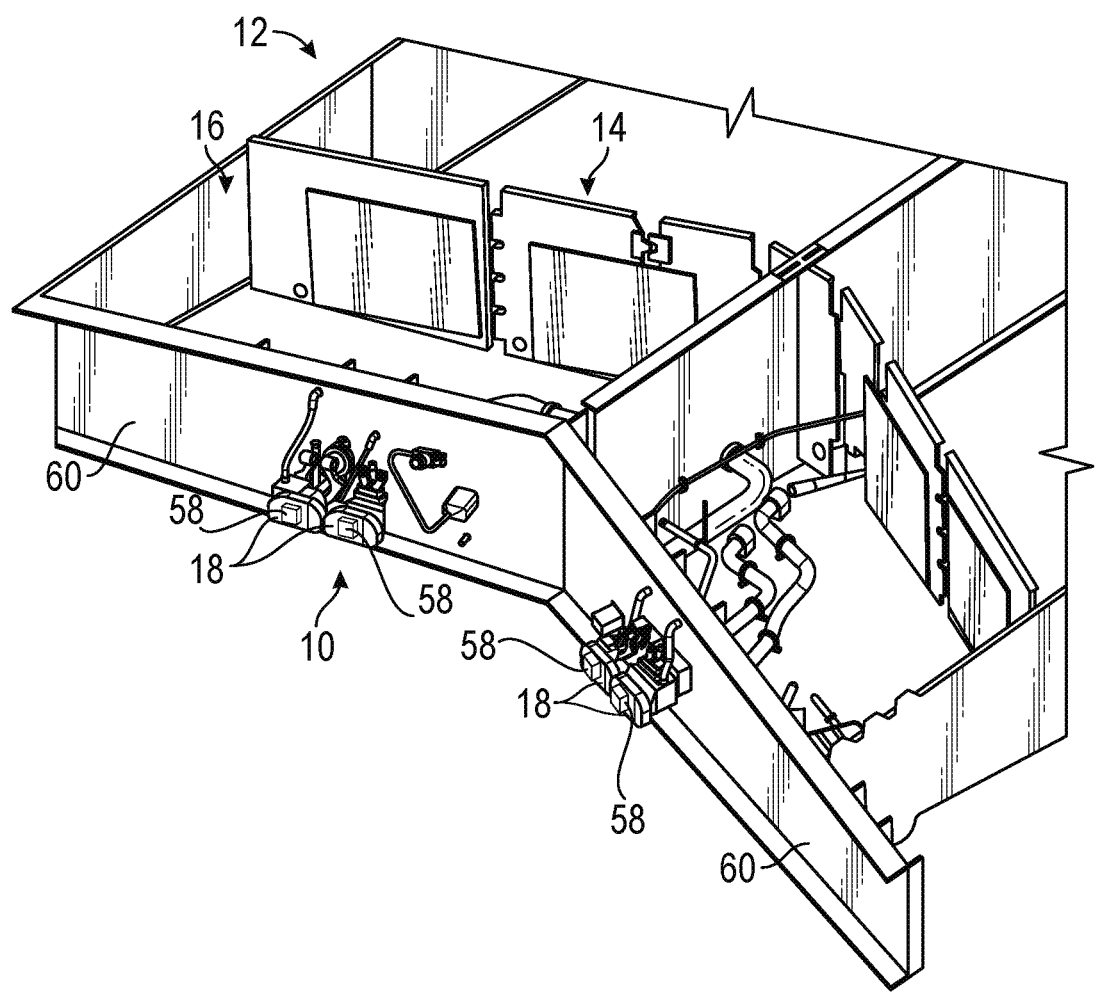
FIG. 1 is a perspective view illustrating a non-limiting embodiment of a fuel system for an aircraft including a fuel tank and a fuel pump.

FIG. 1 is a perspective view illustrating a fuel system 10 for an aircraft 12. The aircraft 12 includes a fuselage and a wing section 14 with the wing section 14 extending away from the fuselage. The fuel system 10 includes a fuel tank 16 configured to receive fuel, such as a hydrocarbon-based fuel, and a fuel pump 18 configured to move the fuel. In embodiments, the fuel tank 16 is disposed in the aircraft 12. In certain embodiments, the wing section 14 includes components, such as front and rear spars, and top and bottom wing skins, that define the fuel tank 16. The aircraft 12 may include additional fuel tanks 16, such as left wing and right wing fuel tanks, and a center fuel tank. Other additional fuel tanks 16 include multiple body fuel tanks, vertical tail tanks, etc. In certain embodiments, the wing section 14 includes a rear spar 60 that defines a portion of the fuel tank 16. Each of the fuel tanks 16 may include one or more fuel pumps 18. The fuel tank 16 may include a metal-containing material. However, it is to be appreciated that the fuel tank 16 may not include a metal-containing material and still be electrically conductive. In certain embodiments, the fuel tank 16 has a resistivity in an amount of no greater than $1 \times 10^3$, alternatively no greater than $1 \times 10^{-2}$ or alternatively no greater than $1 \times 10^{-6}$, ohm-meters, or in an amount of from $1 \times 10^{-10}$ to $1 \times 10^3$, alternatively from $1 \times 10^{-10}$ to $1 \times 10^{-2}$, or alternatively from $1 \times 10^{-10}$ to $1 \times 10^{-6}$, ohm-meters. In embodiments, any resistivity value described herein is determined one minute after application of a measurement voltage at 20° C. and 50% relative humidity.

Figure 2:
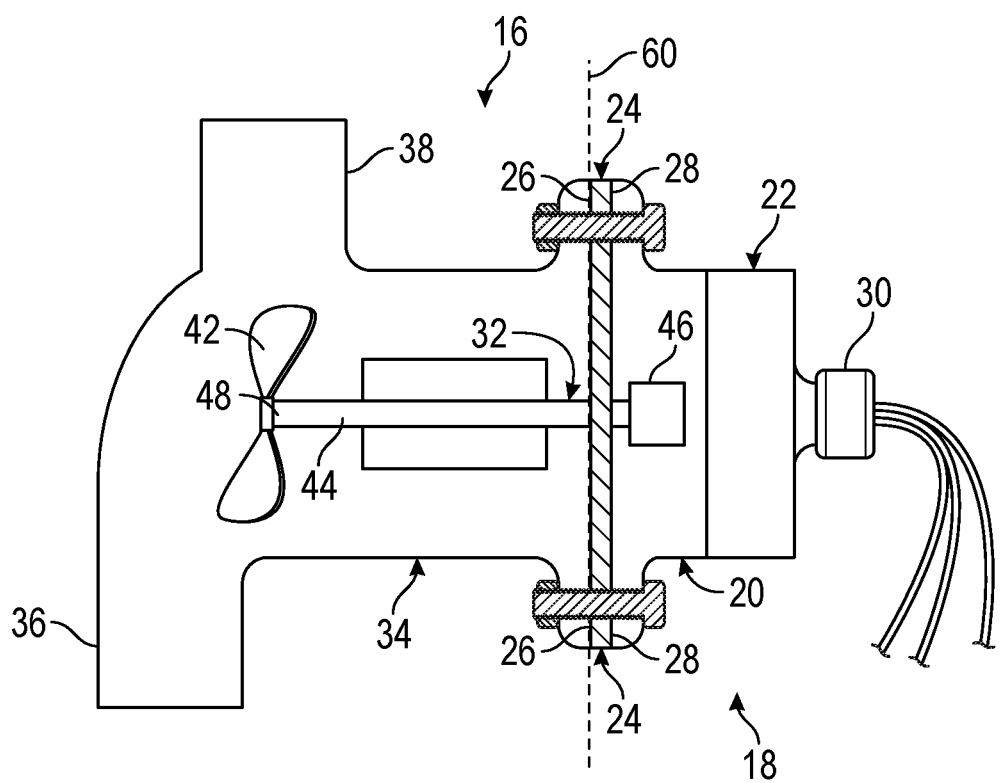
FIG. 2 is a cross-sectional view illustrating a non-limiting embodiment of the fuel pump of FIG. 1.

FIG. 2 is a cross-sectional view illustrating the fuel pump 18 of FIG. 1. The fuel pump 18 may also be referred to in the art as a fuel boost pump or a fuel booster pump. The fuel pump 18 includes a motor 20 disposed proximate the fuel tank 16. In embodiments, the motor 20 is disposed outside the fuel tank 16 with the motor 20 coupled to and adjacent the fuel tank 16. In certain embodiments, the motor 20 is coupled to and adjacent the rear spar 60. However, it is to be appreciated that the motor 20 may be disposed within the fuel tank 16 or the motor 20 may be disposed partially within and partially outside the fuel tank 16. The fuel pump 18 further includes a power supply 22 in electrical communication with the motor 20 and disposed outside the fuel tank 16.

The fuel pump 18 further includes an impeller 32 disposed within the fuel tank 16 and rotatably coupled to the motor 20. The fuel pump 18 may further include a housing 34 disposed within the fuel tank 16 and configured to support the impeller 32. The housing 34 may be coupled to and adjacent the motor 20. The fuel pump 18 may further include an inlet 36 and an outlet 38 with the inlet 36 in fluid communication with the outlet 38 though the housing 34. The impeller 32 may extend from the motor 20, through the housing 34, and to the inlet 36. During operation of the motor 20, the impeller 32 may rotate to move the fuel into the inlet 36, though the housing 34, and out the outlet 38. In embodiments, the outlet 38 is in fluid communication with an engine (not shown) to provide fuel to the engine.

In embodiments, the impeller 32 includes a blade 42 and a shaft 44. The shaft 44 has a first end 46 and a second end 48 spaced from the first end 46. The motor 20 is coupled to the first end 46 and the blade 42 is coupled to the second end 48. The shaft 44 has a resistivity greater than the resistivity of the fuel tank 16 between the first end 46 and the second end 48 to minimize electrical transfer between the motor 20 and the fuel. In certain embodiments, the shaft 44 has a resistivity in an amount of at least $1 \times 10^4$, alternatively at least $1 \times 10^5$ or alternatively at least $1 \times 10^6$, ohm-meters, or in an amount of from $1 \times 10^4$ to $1 \times 10^{20}$, alternatively from $1 \times 10^5$ to $1 \times 10^{20}$, or alternatively from $1 \times 10^6$ to $1 \times 10^{20}$, ohm-meters, between the first end 46 and the second end 48 to minimize electrical transfer between the motor 20 and the fuel. In embodiments, the shaft 44 has an infinite resistivity between the first end 46 and the second end 48 to prevent electrical transfer between the motor and the fuel. Without being bound by theory, the present disclosure contemplates that in situations when the motor 20 experiences an electrical fault, the shaft 44 may interrupt an electrical conductivity path between the electrical fault and the fuel within the fuel tank 16.

Figure 3:
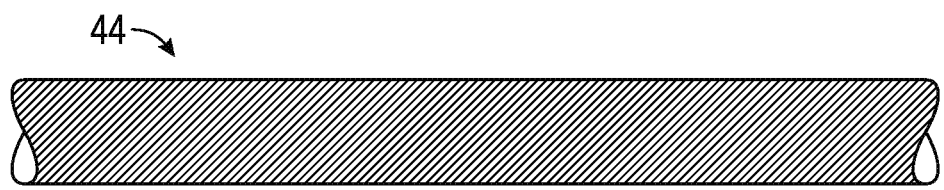
FIG. 3 is a cross-sectional view illustrating a non-limiting embodiment of a shaft of the fuel pump of FIG. 1.

FIG. 3 is a cross-sectional view illustrating a non-limiting embodiment of the shaft 44 of the fuel pump 18 of FIG. 1. In embodiments, the shaft 44 includes, or is formed from, a material having a resistivity in an amount of at least $1 \times 10^4$, alternatively at least $1 \times 10^5$ or alternatively at least $1 \times 10^6$, ohm-meters, or in an amount of from $1 \times 10^4$ to $1 \times 10^{20}$, alternatively from $1 \times 10^5$ to $1 \times 10^{20}$, or alternatively from $1 \times 10^6$ to $1 \times 10^{20}$, ohm-meters. In embodiments, the shaft 44 includes, or is formed from, a material having an infinite resistivity. The shaft 44 may include, or may be formed from, the material in an amount of at least 50, alternatively at least 75 or alternatively at least 90, wt. % based on a total weight of the shaft 44, or in an amount of from 50 to 100, alternatively from 75 to 100 or alternatively from 90 to 100, wt. % based on a total weight of the shaft 44. In embodiments, the material of the shaft 44 is electrically inert. In certain embodiments, the material is selected from the group of polymeric materials, lignocellulosic materials, glass, rubbers, porcelains, ceramics, and combinations thereof. Non-limiting examples of suitable polymeric materials include plastics, such as a phenolic material. In one embodiment, the material includes, or is formed from, a phenolic material. The material may be substantially uniformly disposed throughout the shaft 44 between the first end 46 and the second end 48. The terminology "substantially uniformly disposed" with regard to the material means that the material is uniformly disposed throughout the shaft in an amount of at least 50, alternatively at least 75, alternatively at least 80, alternatively at least 90, alternatively at least 95, or alternatively at least 99%.

Figure 4:
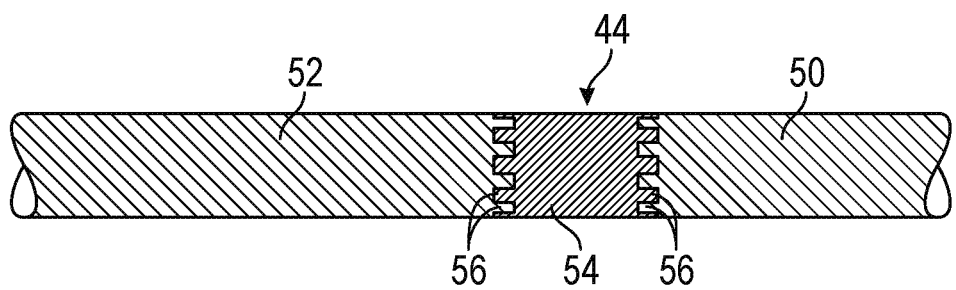
FIG. 4 is a cross-sectional view illustrating another non-limiting embodiment of a shaft of the fuel pump of FIG. 1.

FIG. 4 is a cross-sectional view illustrating another non-limiting embodiment of the shaft 44 of the fuel pump 18 of FIG. 1. In embodiments, the shaft 44 includes a first portion 50, a second portion 52, and an isolator portion 54 with the isolator portion 54 disposed between the first portion 50 and the second portion 52 to minimize electrical transfer between the motor 20 and the fuel. In embodiments, the isolator portion 54 is disposed between the first portion 50 and the second portion 52 to prevent electrical transfer between the motor 20 and the fuel. In embodiments, the isolator portion 54 is proximate the first end 46 such that the isolator portion 54 is between the motor 20 and the fuel tank 16. The first end 46 of the shaft 44 may be adjacent the first portion 50 and the second end 48 of the shaft 44 may be adjacent the second portion 52. The shaft 44 may be a unitary component including the portions 50, 52, 54 or the portions 50, 52, 54 may be separate components with the portions 50, 52, 54 coupled to one another to form the shaft 44. In certain embodiments, the portions 50, 52, 54 are separate components with a first portion 50 and the second portion 52 configured to couple to the isolator portion 54. The first portion 50 and the second portion 52 may each include a locking feature 56. The isolator portion 54 may include two locking features 56 spaced from each other with the locking features 56 of the first portion 50 and the second portion 52 cooperating with the locking features 56 of the isolator portion 54 to form the shaft 44. Cooperation of the locking features 56 results in a rigid relationship between the first end 46 and the second end 48 of the shaft 44 such that as the first end 46 rotates during operation of the motor 20, the second end 48 rotates the blade 42.

In embodiments, the isolator portion 54 has a resistivity greater than the resistivity of the fuel tank 16 to minimize electrical transfer between the motor 20 and the fuel. In certain embodiments, the isolator portion 54 includes, or is formed from, a material having a resistivity in an amount of at least $1\times10^4$, alternatively at least $1\times10^5$ or alternatively at least $1\times10^6$, ohm-meters, or in an amount of from $1\times10^4$ to $1\times10^{20}$, alternatively from $1\times10^5$ to $1\times10^{20}$, or alternatively from $1\times10^6$ to $1\times10^{20}$, ohm-meters. In embodiments, the isolator portion 54 includes, or is formed from, a material having an infinite resistivity. The isolator portion 54 may include, or may be formed from, the material in an amount of at least 50, alternatively at least 75 or alternatively at least 90, wt. % based on a total weight of the isolator portion 54, or in an amount of from 50 to 100, alternatively from 75 to 100 or alternatively from 90 to 100, wt. % based on a total weight of the isolator portion 54. In embodiments, the material of the isolator portion 54 is electrically inert. In certain embodiments, the material is selected from the group of polymeric materials, lignocellulosic materials, glass, rubbers, porcelains, ceramics, and combinations thereof. Non-limiting examples of suitable polymeric materials include plastics, such as a phenolic material. In one embodiment, the material includes, or is formed from, a phenolic material.

Referring back to FIG. 2, the fuel system 10 may also include an isolator component 24 disposed between the power supply 22 and the fuel tank 16. More specifically, in embodiments, the isolator component 24 is disposed between the motor 20 and the fuel tank 16. In these embodiments, the power supply 22 may be coupled to and adjacent the motor 20, and spaced from the fuel tank 16. The isolator component 24 may have a resistivity greater than the resistivity of the fuel tank 16 to minimize electrical transfer between the motor 20 and the fuel. In embodiments, the isolator component 24 has a resistivity in an amount of at least $1\times10^4$, alternatively at least $1\times10^5$ or alternatively at least $1\times10^6$, ohm-meters, or in an amount of from $1\times10^4$ to $1\times10^{20}$, alternatively from $1\times10^5$ to $1\times10^{20}$, or alternatively from $1\times10^6$ to $1\times10^{20}$, ohm-meters, to minimize electrical transfer between the power supply 22 and the fuel. In embodiments, the isolator component 24 has an infinite to prevent electrical transfer between the power supply 22 and the fuel. Without being bound by theory, the present disclosure contemplates that in situations when the motor 22 experiences an electrical fault, the isolator component 24 may interrupt an electrical conductivity path between the electrical fault and the fuel within the fuel tank 16.

In embodiments, the isolator component 24 has a first side 26 facing the fuel tank 16 and a second side 28 facing the motor 20. The first side 26 may be disposed on and in direct contact with the fuel tank 16. In certain embodiments, the first side 26 is disposed on and in direct contact with the rear spar 60. The motor 20 may be disposed on and in direct contact with the second side 28. The isolator component 24 may define a first orifice (not shown) extending between the first side 26 and the second side 28. The power supply 22 may be in electrical communication with the motor 20 through the orifice. The isolator component 24 may have any configuration suitable to isolate the power supply 22 or the motor 20 from the fuel tank 16. The isolator component 24 may have a thickness extending between the first side 26 and the second side 28 in any amount so long as the isolator component 24 has a suitable resistivity as described herein.

In embodiments, the isolator component 24 includes, or is formed from, a material having a resistivity in an amount of at least $1\times10^4$, alternatively at least $1\times10^5$ or alternatively at least $1\times10^6$, ohm-meters, or in an amount of from $1\times10^4$ to $1\times10^{20}$, alternatively from $1\times10^5$ to $1\times10^{20}$, or alternatively from $1\times10^6$ to $1\times10^{20}$, ohm-meters. In embodiments, the isolator component 24 includes, or is formed from, a material having an infinite resistivity. The isolator component 24 may include, or may be formed from, the material in an amount of at least 50, alternatively at least 75 or alternatively at least 90, wt. % based on a total weight of the isolator component 24, or in an amount of from 50 to 100, alternatively from 75 to 100 or alternatively from 90 to 100, wt. % based on a total weight of the isolator component 24. In embodiments, the material of the isolator component 24 is electrically inert. In certain embodiments, the material is selected from the group of polymeric materials, lignocellulosic materials, glass, rubbers, porcelains, ceramics, and combinations thereof. Non-limiting examples of suitable polymeric materials include plastics, such as a phenolic material. In one embodiment, the material includes, or is formed from, a phenolic material.

In embodiments, the power supply 22 generates heat during operation of the motor 20. As a result of the generation of heat, the power supply 22 may have an increase in temperature. The power supply 22 may include a transformer (not shown) with the transformer generating heat during operation of the motor 20. It is to be appreciated that the power supply 22 may include additional components known in the art such as a printed circuit boards (PCBs), resistors, capacitors, and the like. These additional components may also generate heat during operation of the motor 20. The power supply 22 may also include an electrical connection 30 in electrical communication with the aircraft 12. The power supply 22 may be configured to receive a DC or AC electrical current from the aircraft 12. The power supply 22 may be configured to provide the motor 20 a conditioned 3-phase AC electrical current to operate the motor 22.

In embodiments, the fuel system 10 further includes a cooling component 58 (see FIG. 1) in fluid communication with the power supply 22 to transfer the heat away from the power supply 22. Heat may be transferred away utilizing conduction, convection or radiation. The cooling component 58 may utilize a fluid carrier (not shown) to transfer the heat away from the power supply 22 thereby reducing the temperature of the power supply 22. The fluid carrier may be a gaseous fluid, a liquid fluid, or a combination thereof. In certain embodiments, the fluid carrier includes air from outside the wing section 14 with the air utilized to transfer heat away from the power supply 22. It is to be appreciated that air from outside the aircraft 12 may also be utilized to transfer heat away from the power supply 22. In embodiments, air from within the wing section 14 is not suitable for transferring heat away from the power supply 22 due to potential fuel vapors in the air therein. In various embodiments, the fluid carrier includes air and is substantially free of fuel to minimize exposure of the power supply 22 to fuel vapors. The terminology "substantially free" with regard to fuel means that the fluid carrier includes fuel in an amount of no greater than 10, alternatively no greater than 5, alternatively no greater than 3, alternatively no greater than 1, or alternatively no greater than 0.1, wt. % based on a total weight of the fluid carrier. Without being bound by theory, the present disclosure contemplates that in situations when the power supply 22 experiences an electrical fault, the fluid carrier substantially free of fuel minimizes exposure of the power supply 22 to the fuel vapors during the electrical fault.

The cooling component 58 may include a fan (not shown) configured to move the air proximate the power supply 22 to transfer heat away from the power supply 22. In one embodiment, the cooling component 58 is in electrical communication with the fuel pump 18 such that when the motor 20 operates, the cooling component 58 operates. In another embodiment, the cooling component 58 includes a temperature sensor (not shown) configured to determine the temperature of the power supply 22. When the temperature sensor detects that the power supply 22 has reached a predetermined temperature, the cooling component 58 may be configured to operate.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A fuel system for an aircraft, comprising:
   a fuel tank configured to receive fuel;
   a fuel pump, comprising;
   a motor disposed proximate the fuel tank,
   a power supply in electrical communication with the motor and disposed outside the fuel tank,
   an impeller disposed within the fuel tank and rotatably coupled to the motor, the impeller comprising a shaft having a first end and a second end spaced from the first end with the motor coupled to the first end, and the shaft having a resistivity greater than the resistivity of the fuel tank between the first end and the second end to minimize electrical transfer between the motor and the fuel, wherein the shaft comprises a first portion, a second portion, and an isolator portion that is disposed between the first and second portions, wherein the first portion includes the first end and the second portion includes the second end, and wherein the first portion and the second portion are made of an electrically conductive material and the isolator portion is made of an electrically inert material; and
   an isolator component disposed between the motor and the fuel tank and having a resistivity greater than the resistivity of the fuel tank to minimize electrical transfer between the motor and the fuel, wherein the isolator component extends outwardly from the isolator portion of the shaft to form a wall that is disposed on the fuel tank to form a barrier between the fuel tank and the motor.

2. The fuel system of claim 1, wherein the shaft comprises a material having a resistivity in an amount of at least $1 \times 10^4$ ohm-meters, and the shaft comprises the material in an amount of at least 50 wt. % based on a total weight of the shaft.

3. The fuel system of claim 1, wherein the isolator portion comprises a material having a resistivity in an amount of at least $1 \times 10^4$ ohm-meters, and the isolator portion comprises the material in an amount of at least 50 wt. % based on a total weight of the isolator portion.

4. The fuel system of claim 1, wherein the impeller further comprises a blade coupled to the second end of the shaft.

5. The fuel system of claim 1, wherein the isolator component has a resistivity of at least $1 \times 10^4$ ohm-meters to minimize electrical transfer between the power supply and the fuel.

6. The fuel system of claim 1, wherein the isolator component comprises a material having a resistivity in an amount of at least $1 \times 10^4$ ohm-meters, and the isolator component comprises the material in an amount of at least 50 wt. % based on a total weight of the isolator component.

7. The fuel system of claim 6, wherein the material comprises a phenolic material.

8. The fuel system of claim 1, wherein the motor is disposed outside the fuel tank, the isolator component has a first side facing the fuel tank and a second side facing the motor, the first side is disposed on and in direct contact with the fuel tank, and the motor is disposed on and in direct contact with the second side.

9. The fuel system of claim 1, wherein the power supply generates heat during operation of the motor, and the fuel system further comprises a cooling component in fluid communication with the power supply to transfer the heat away from the power supply.

10. The fuel system of claim 9, wherein the cooling component may utilize a fluid carrier to transfer the heat away from the power supply.

11. The fuel system of claim 10, wherein the fluid carrier comprises air and is substantially free of fuel to minimize electrical transfer between the power supply and the fuel.

12. The aircraft of claim 1, wherein the first portion comprises a first locking feature, the isolator portion comprises a second locking feature and a third locking feature, and the second portion comprises a fourth locking feature, wherein the first locking feature and the second locking feature are engaged, coupling the first portion and the isolator portion together, and wherein the third locking feature and the fourth locking feature are engaged, coupling the isolator portion and the second portion together.

13. An aircraft comprising a fuel system, the fuel system comprising:
   a fuel tank disposed in the aircraft and configured to receive fuel;
   a fuel pump, comprising;
   a motor disposed proximate the fuel tank,
   a power supply in electrical communication with the motor and disposed outside the fuel tank, an impeller disposed within the fuel tank and rotatably coupled to the motor, the impeller comprising a shaft having a first end and a second end spaced from the first end with the motor coupled to the first end, and the shaft having a resistivity greater than the resistivity of the fuel tank between the first end and the second end to minimize electrical transfer between the motor and the fuel, wherein the shaft comprises a first portion, a second portion, and an isolator portion that is disposed between the first and second portions, wherein the first portion includes the first end and the second portion includes the second end, and wherein the first portion and the second portion are made of an electrically conductive material and the isolator portion is made of an electrically inert material; and an isolator component disposed between the motor and the fuel tank and having a resistivity greater than the resistivity of the fuel tank to minimize electrical transfer between the motor and the fuel, wherein the isolator component extends outwardly from the isolator portion of the shaft to form a wall that is disposed on the fuel tank to form a barrier between the fuel tank and the motor.

14. The aircraft of claim 13, wherein the shaft comprises a material having a resistivity in an amount of at least $1 \times 10^4$ ohm-meters, and the shaft comprises the material in an amount of at least 50 wt. % based on a total weight of the shaft.

15. The aircraft of claim 13, wherein the shaft comprises a first portion, a second portion, and an isolator portion with the isolator portion disposed between the first portion and the second portion.

16. The aircraft of claim 15, wherein the isolator portion comprises a material having a resistivity in an amount of at least $1 \times 10^4$ ohm-meters, and the isolator portion comprises the material in an amount of at least 50 wt. % based on a total weight of the isolator portion.

17. The aircraft of claim 13, wherein the impeller further comprises a blade coupled to the second end of the shaft.

18. The aircraft of claim 13, wherein the isolator component has a resistivity of at least $1 \times 10^4$ ohm-meters to minimize electrical transfer between the power supply and the fuel.

* * * * *